United States Patent
Calleja Araque et al.

(10) Patent No.: US 9,788,556 B2
(45) Date of Patent: Oct. 17, 2017

(54) PROCESS FOR THE COAGULATION OF WASTED EGGS

(71) Applicant: INGENIERÍ AVÍCOLA S.L., Boecillo-Valladolid (ES)

(72) Inventors: Oscar Calleja Araque, Boecillo-Valladolid (ES); Ruth Vivas Fermín, Boecillo-Valladolid (ES); Jorge Galarza Sanz, Boecillo-Valladolid (ES)

( * ) Notice: Subject to any disclaimer, the term of this patent is extended or adjusted under 35 U.S.C. 154(b) by 112 days.

(21) Appl. No.: 14/390,753

(22) PCT Filed: Apr. 3, 2013

(86) PCT No.: PCT/EP2013/057010
§ 371 (c)(1),
(2) Date: Oct. 3, 2014

(87) PCT Pub. No.: WO2013/150067
PCT Pub. Date: Oct. 10, 2013

(65) Prior Publication Data
US 2015/0079233 A1    Mar. 19, 2015

(30) Foreign Application Priority Data

Apr. 4, 2012   (EP) ..................................... 12163179
May 18, 2012   (EP) ..................................... 12382184

(51) Int. Cl.
*A23B 5/025*   (2006.01)
*A23B 5/005*   (2006.01)
(Continued)

(52) U.S. Cl.
CPC ............ *A23B 5/025* (2013.01); *A23B 5/0055* (2013.01); *A23K 10/20* (2016.05); *A23L 15/00* (2016.08);
(Continued)

(58) Field of Classification Search
CPC ................................ A21B 1/00; A23B 5/025
See application file for complete search history.

(56) References Cited

U.S. PATENT DOCUMENTS 2,476,412 A * 7/1949 Harris .................... A23B 5/025
                                                        426/47
2,571,459 A * 10/1951 Lindsay ................. A23B 5/022
                                                      159/4.07
(Continued)

FOREIGN PATENT DOCUMENTS

EP       0179946 A1    5/1986
GB       102815        1/1917
(Continued)

OTHER PUBLICATIONS

Xu Hua (CN 001052385) May 17, 2000 Derwent Abstract 1 page.*
(Continued)

*Primary Examiner* — Jill Warden
(74) *Attorney, Agent, or Firm* — Knobbe, Martens, Olson & Bear, LLP

(57) ABSTRACT

A process to coagulate wasted eggs which includes an acidification step of the liquid egg, followed by a coagulation step using a heat exchanger, such as a scraped surface heat exchanger, and optionally a drying step. The obtained coagulated egg product has useful properties and can be used as animal food. The process allows the disposal of wasted eggs generated in the poultry and related industries and the production of a valuable by-product with high protein and fat content.

7 Claims, 1 Drawing Sheet

(51) Int. Cl.
*A23N 17/00* (2006.01)
*A23K 10/20* (2016.01)
*A23L 15/00* (2016.01)

(52) U.S. Cl.
CPC .............. *A23L 15/25* (2016.08); *A23L 15/30* (2016.08); *A23N 17/001* (2013.01); *A23N 17/002* (2013.01); *A23N 17/004* (2013.01); *A23V 2002/00* (2013.01)

(56) References Cited

U.S. PATENT DOCUMENTS

| | | | |
|---|---|---|---|
| 3,778,425 A | 12/1973 | Kandatsu et al. | |
| 4,511,589 A | 4/1985 | Padly et al. | |
| 5,431,939 A | * 7/1995 | Cox | A01K 41/00 426/298 |
| 6,348,223 B1 | 2/2002 | Claycamp et al. | |
| 2003/0091711 A1 | 5/2003 | Sanderson | |
| 2005/0287260 A1 | 12/2005 | Efstathiou et al. | |

FOREIGN PATENT DOCUMENTS

| | | |
|---|---|---|
| JP | 2007222074 A | 9/2007 |
| KR | 20090107833 A | 10/2009 |
| WO | 20061060812 A1 | 6/2006 |

OTHER PUBLICATIONS

International Search Report dated Mar. 13, 2014 for PCT/EP2013/057010.

International Preliminary Report on Patentability dated Sep. 12, 2014 for PCT/EP2013/057010.

* cited by examiner

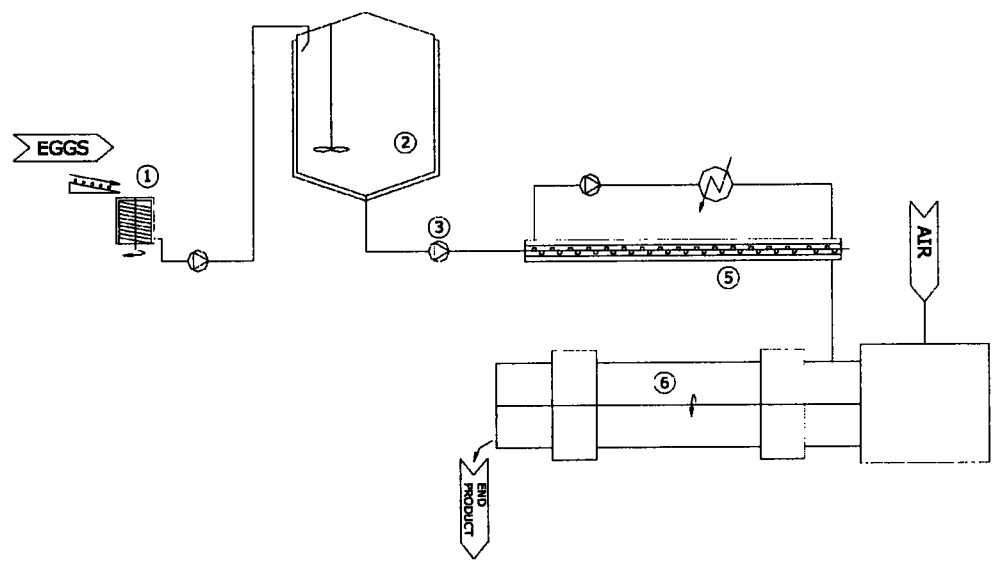

PROCESS FOR THE COAGULATION OF WASTED EGGS

CROSS REFERENCE TO RELATED APPLICATIONS

This application is the U.S. National Phase of International Application No. PCT/EP2013/057010, filed Apr. 3, 2013, designating the U.S. and published in English as WO 2013/150067 on Oct. 10, 2013 which claims the benefit of European Patent Application No. 12163179.0, filed Apr. 4, 2012 and European Patent Application No. 12382184.5, filed May 18, 2012.

TECHNICAL FIELD

The present invention relates to the processing of wasted eggs, an installation for this process and the product resulting from this process.

BACKGROUND OF THE INVENTION

The poultry industry is one of the fastest growing segments of the animal industry. More than 50 billion chickens are raised annually as a source of food, for both their meat and their eggs. About 75 percent of the world's poultry meat, and 68 percent of eggs are produced in ways that are described as intensive.

In this industry, the handling of wasted or bad eggs represents a serious logistical and environmental problem. Wasted eggs arise from different sources: eggs that do not meet the standards for human consumption (too big or too small, contaminated, etc), eggs from incubator farms (hatcheries) that fail developing chickens, eggs that are not sold and pass their "best before" date, etc. These wasted eggs are difficult to transport and handle.

Animal by-products not intended for human consumption are a potential source of risks to public and animal health. Wasted eggs are considered a "Category 3" under European regulation 1069/2009 laying down health rules as regards animal by-products and derived products not intended for human consumption. This means that wasted eggs can be disposed of by various means, including processing in a plant approved to handle it, use in the manufacture of pet food, in the oleochemical industry or in the manufacture of technical products such as fertilizer. But it cannot be disposed in a landfill, because it would lead to unsustainable costs and risks for the environment. Therefore the processing of wasted eggs is highly desirable.

In a commonly used process, eggs are broken to separate the shell, and the resulting liquid is pasteurized, concentrated and spray dried to generate "egg powder", suitable for consumption or animal feed. In this process it is important that the egg does not coagulate, since the powder egg must retain its functional characteristics and be able to regenerate egg or an egg-like product upon moisturizing.

Although making powder egg via spray drying would be a possible solution for handling eggs that should be discarded, such a process is expensive for waste material and cannot be used for economical reasons.

GB 102,815 describes the processing of wasted eggs for the manufacture of foodstuff for animals or poultry. Eggs are broken, heated in a drier to 115° C. with the addition of preservatives, and ground.

U.S. Pat. No. 3,778,425 discloses a process for the manufacture of granular or powdery purified whole egg protein by heating in the presence of solvents such as alcohol forming coagulated egg proteins which are contacted with water to remove carbohydrates and inorganic salts, and then a solvent to remove fat. The protein substance is dried to form a granular product, useful as protein source, animal feed or food supplement.

JP2007222074 describes a process to prepare animal feed from eggs, using a grinder, heating machine, a dryer, a grinder and a sieve. The shell is not separated.

U.S. Pat. No. 6,348,223 describes a milk replacer product made from inedible egg product. The process includes separation of the shell, refrigerating the liquid egg to 7° C. or less, heat-pasteurizing at 60° C. for at least 4.5 minutes and packaging to produce a liquid product or spray drying to generate egg powder.

U.S. Pat. No. 4,511,589 discloses a process for the continuous pasteurization of eggs characterized in that liquid egg material is passed under operating pressure through a first scraped surface heat exchanger to raise the temperature of the egg material to the pasteurization temperature, after which it is passed to a heated holding vessel under pressure of a sterile inert gas for a period of time which ensures pasteurization but which is sufficiently short to ensure that substantially no coagulation occurs, and finally through a second scraped surface heat exchanger where it is cooled to a temperature below 10° C. over a period of time less than 5 minutes. The scraped surface heat exchangers avoid problems with the flowability and high viscosity of the eggs, but coagulation is avoided.

US 2005/0287260 refers to a method for extending the shelf life of egg products. This method comprises pasteurizing egg material and treating the pasteurized egg material with pressure. Acidifying agents may be added to the egg material before or after pasteurization.

KR 20090107833 discloses a method of preparing egg fermentation food to extend the shelf life of egg. Egg liquid is fermented using *Aspergillus* sp. and then coagulated.

There still remains the need for a process to process wasted eggs in a simple and economic way, able to solve the problems coagulation can cause in the handling equipment, and converting the wasted eggs in a valuable material.

BRIEF DESCRIPTION OF THE INVENTION

The inventors have designed a process to convert wasted eggs into a valuable coagulated product, rich in proteins, in a simple manner, and avoiding the problems that the high viscosity of the egg and the coagulation of the liquid egg generates in the equipment. The obtained product has controlled characteristics, and is excellent as animal food, because of its content in proteins and fats. In addition, this process allows obtaining a product with a low moisture content (less than 15% by weight) which is particularly suitable as animal food since it is shelf-stable.

The final product after drying is characterized by having a water content of less than 15% by weight, preferably less than 10%. The protein content is usually above 30% by weight, preferably above 40% by weight, and the fat content is preferably from about 20% to about 40% by weight. The obtained product is formed of small granules of coagulated egg. The particle size of the granules are preferably from about 0.1 to about 3.0 mm, more preferably from about 0.1 to about 1.0 mm.

Therefore, in a first aspect, the invention relates to a process for the production of a coagulated egg product which comprises, in order, the following steps:

a) separating the liquid egg from the shells;
b) acidifying the liquid egg product to a pH in the range of from about 3 to about 6.0;
c) heating and coagulating the acidified liquid egg.

The process of the invention can be continuous or in batch mode.

Optionally, the process comprises the additional step of drying the acidified and coagulated egg product resulting from step c). Additionally, the process can comprise a step of grinding and optionally sieving the product, and storing it in a container.

The acidifying step b) can be carried out by means of a fermentation process, or by the addition of an acid, preferably an acid which is a food preservative such as citric acid. In the acidifying step, the pH is preferably adjusted to a pH of from about 4.0 to about 5.8, more preferably from about 4.5 to about 5.5.

In another embodiment, step c) comprises the use of a heat exchanger, preferably a scraped surface heat exchanger.

In another aspect, the invention is directed to a coagulated egg product obtainable by the process as defined above, and to the use of this product in animal food.

In a further aspect, the invention is directed to an apparatus for the coagulation of wasted eggs which comprises:
  a) means for separating the liquid egg from the shells,
  b) means for acidifying the liquid egg,
  c) means for heating and coagulating the acidified liquid egg, and
  d) optional means for drying the coagulated egg, and optional means for reducing the particle size of the coagulated egg.

In one embodiment, the means for separating the liquid egg from the shells are selected from shell centrifuge, basket centrifuge or a screw press. Preferably, a shell centrifuge is used.

In another embodiment, the means for heating and coagulating the acidified liquid egg is a heat exchanger, preferably a scraped surface heat exchanger.

In a particular embodiment, b) are means for acidifying the liquid egg to a pH in the range of from about 3 to about 6.0, preferably from about 3 to about 5.8, preferably from 4.0 to 5.8, more preferably from 4.5 to 5.5, more preferably from 4.5 to 5.3, even more preferably from 4.5 to 5.1, especially preferred from 4.9 to 5.1.

Finally, the invention is also directed to the use of a scraped surface heat exchanger in a process for the coagulation of acidified liquid eggs, wherein the pH is in a range of from about 3 to about 6.0, preferably from about 3 to about 5.8, preferably from 4.0 to 5.8, more preferably from 4.5 to 5.5, more preferably from 4.5 to 5.3, even more preferably from 4.5 to 5.1, especially preferred from 4.9 to 5.1.

BRIEF DESCRIPTION OF DRAWINGS

FIG. 1. Schematic view of the apparatus for the process of the invention.

DETAILED DESCRIPTION OF THE INVENTION

The present invention relates to a process for the coagulation of eggs, in an industrial and controlled manner, and to a product so obtained. This product is suitable for different purposes, among others for use as animal food.

Several problems are usually found when trying to obtain coagulated egg products:

- liquid egg is difficult to handle due to its viscosity and its tendency to separate into phases;
- once the coagulation process begins, the coagulated product becomes very sticky and difficult to handle;
- big lumps of coagulated egg are formed that clog the installation or prevents its use in a continuous mode;
- a coagulated product resembling scrambled eggs is obtained, which sticks to the surface of the equipment and requires very long times to get dry;
- coagulates of egg with very heterogeneous properties are obtained, which complicates their further manipulation;
- big coagulated egg particles that cannot be properly dried are obtained thus giving rise to a shelf-unstable product;
- process cannot be operated in a continuous mode;
- egg products with suitable properties for its use as animal food, e.g. water, protein or fat content, are not obtained;
- process is too expensive for its use in the manufacture of animal food.

These problems can be solved by the process of the invention.

In a particular embodiment, the invention is directed to a process for the production of a coagulated egg product which comprises, in order, the following steps:
  a) separating the liquid egg from the shells;
  b) acidifying the liquid egg product to a pH in the range of from about 3 to about 6.0; preferably to a pH from about 4 to about 5.8;
  c) heating and coagulating the acidified liquid egg in a scraped surface heat exchanger.

The wasted eggs that can be processed according to the invention can have different origins. For example they can be eggs that do not meet the standards for human consumption such as broken eggs, eggs that are too big or too small, contaminated eggs, etc. Another source of wasted eggs are those from incubator farms that failed in the reproduction and do not develop into chicks. Wasted eggs can also originate from the distribution chain, shops and restaurants, for examples eggs that are not sold, eggs pass their "best before" date, eggs that at some point were not under proper temperature or handling conditions, etc. When referring to wasted eggs we also encompass eggs from different animals such as chickens, ducks, turkey, quail, etc.

The invention is not restricted to any particular source of eggs. It has the advantage of processing in a convenient and economical manner eggs that otherwise would have to be disposed of. Therefore, the process of the invention can also be used with normal eggs suitable for human consumption, if desired.

In a first step of the process, the eggs are separated from the shell with equipment known to the skilled person, to produce liquid egg, i.e. egg albumen and egg yolk, without adding or removing water. For example a shell centrifuge, basket centrifuge or a screw press can be used. These apparatuses are well known to the skilled person and are used in eggshell treatment for the poultry industry. The separation step can be realised in batch or continuous mode.

Depending on the intended use of the final product, it might be more or less important that some part of the shell remains with the liquid egg, because it can provide specific properties to the final coagulated product. In a preferred embodiment less that 5% by weight of the shell remains in the liquid egg fraction, preferably less than 3%, more preferably less than 1%.

The liquid egg that has been separated can optionally be introduced in a holding vessel before the coagulation step. A holding vessel will be necessary when operating in batch mode, to store the liquid egg until it is processed further to the coagulation step. The holding vessel can be heated or refrigerated as required, in order to maintain the liquid egg in the desired conditions. If the liquid egg will be stored for a few days, then cooling of the holding vessel is preferred, in order to avoid the growth of harmful bacteria. For example, the liquid egg can be introduced in a storage vat with stirring which may be cooled with ice-water.

Importantly, the inventors have found that fresh liquid egg causes problems in the coagulation and drying steps. Indeed, the liquid egg is difficult to handle with standard equipment due to its viscosity and its tendency to separate into phases. In addition, once the coagulation process begins upon heating, the coagulated product becomes very sticky, forming big lumps of coagulated egg that clog the installation, with the result that it cannot be processed adequately by the equipment.

Surprisingly, the inventors have found that acidification of the liquid egg improves the coagulation step. The acidification changes the nature of the proteins and their rheological properties, homogenises the product, and favours microcoagulation. This makes the liquid egg easier to handle and less prone to stick to the equipment used for coagulation and drying. The process can be controlled via the pH.

In particular, the inventors have found that when the pH value is between 6.0 and 7.5 several problems that make the process unsuitable from an industrial point of view are observed:

egg coagulates with very heterogeneous size distribution are obtained. As a result, bigger particles could not be properly dried thus giving rise to an egg product that does not comply with the water content requirements for animal food and that rapidly degrades during storage. On the other hand, smaller particles are excessively dried thus giving rise to the loss of protein and fat content;
  unstable operation of the scraped surface heat exchanger. Big lumps of coagulated egg are formed, which clog the heat exchanger thus making the process unsuitable from an industrial point of view;
  the ratio of coagulated egg and water at the exit of the scraped surface heat exchanger is very heterogeneous. Sometimes, the mixture at the exit of the heat exchanger is mainly made of coagulated egg and does not flow properly, so that the heat exchanger can clog. On the other hand, when the mixture is mainly made of water, problems during the drying step are observed.

The inventors have surprisingly found that these problems can be avoided by the process of the invention.

In addition, the inventors have also observed that the use of this process avoids problems during the drying step. In particular, when high pH values are used, a coagulated product resembling scramble eggs is obtained, which sticks to the hot surface of the drier and, in addition, requires longer times to get dry. On the contrary, when the process of the invention is used, smaller and hard coagulates are formed, which do not break during the drying step and provide faster drying speed.

In a particular embodiment, pH is in a range of from about 3 to about 5.8, preferably from 4.0 to 5.8, more preferably from 4.5 to 5.5. Especially better results can be obtained by using a pH in the range of from 4.5 to 5.3, preferably from 4.5 to 5.1, more preferably from 4.9 to 5.1.

In one embodiment, the acidification occurs naturally, via fermentation. It suffices to store the liquid egg and allow a light fermentation with natural or added bacteria to occur. During the fermentation the liquid egg acidifies, and it is preferably controlled to a pH of from 5.2 to about 6.0, more preferably from about 5.3 to about 5.5.

However, in a more preferred embodiment, instead of fermentation, the characteristics of the liquid egg are adjusted and controlled directly by using an acidifying agent. The acidification achieves the same result as the fermentation but much faster and in a much more controlled manner. In fact, once acidified, the liquid egg has improved properties and can be processed directly, without the need of storage for some time. In this embodiment, it is preferred that the pH be in a range of from about 3 to 5.8, preferably from about 4.0 to about 5.8, preferably from about 4.5 to about 5.5, more preferably from about 4.5 to 5.3, even more preferably from about 4.5 to 5.1, especially preferred from about 4.9 to about 5.1.

In this embodiment, the pH is preferably adjusted with an acid authorised for food products, such as citric acid. Citric acid has the advantage of being a well know preservative and is widely used in the food industry. Therefore, citric acid not only changes the properties of liquid egg and makes it suitable for the coagulation process of the invention, but in addition acts as a preservative. This is useful when working under batch conditions, when the liquid egg has to be stored up to several days. The use of an acid such as citric acid avoids or stops undesired fermentation, biological degradation, bad smells and phase separation in the liquid egg.

In addition, the citric acid will be present and act as a preservative of the final coagulated product, which is an advantage for both batch and continuous processes.

The modification of the liquid egg properties, preferably via acidification or via fermentation, can be carried out in a holding vessel with stirring. The acidification is controlled measuring the amount of acid used, or measuring the pH.

Alternatively, mixing of the egg with the acid can be carried out without using a holding vessel. In such a case the mixing can be carried out for example in a pipe with a static or dynamic mixer, the mixing process is determined by the length of the pipe used. The skilled person can use any other standard equipment used for mixing as long as it is suitable for the processing of liquid egg.

Once the liquid egg has been modified as explained above, it can enter the coagulation step. In the coagulation step, the liquid egg is heated under controlled conditions in order to prepare the desired coagulated egg product of the invention. Preferably the temperature of the coagulation step ranges from 70° C. to 95° C., more preferably from 75° C. to 90° C.

Coagulation is preferably realised in a heat exchanger. The modification step above allows the coagulation to proceed quickly, the coagulated product does not stick to the equipment and exits the coagulation step in the form of a flowable slurry which facilitates the handling of the product. Without willing to be bound by any theory, the inventors propose that this slurry is made up of small microcoagulated granules, which stick together due to the water content of the product. This avoids the formation of big lumps of coagulated proteins, and facilitates the flow of the slurry through the equipment used for coagulation and drying. Besides, the acid modification is critical in the homogeneity of the final product.

In one preferred embodiment a scraped surface heat exchanger is used for the coagulation of the modified liquid egg.

A scraped surface heat exchanger generally features a tubular outer housing which surrounds a rotating central shaft. The rotating central shaft has hingedly connected paddles or blades that extend angularly radially outward and contact the inside surface of the outer housing as the central shaft rotates. The outer housing has a material inlet at one end and a material outlet at the other end and the material being processed, in this case modified liquid egg, is pumped through so that it passes along the length of the heat exchanger from the inlet to the outlet. The outer housing is typically heated or cooled so that the material will undergo a change of temperature as it passes through the scraped surface heat exchanger. Further, the paddles or blades help agitate the material and/or scrape it off the inside surface of the heat exchanger as desired. In a preferred embodiment the central shaft moves axially back and forth, moving the paddles or blades along the inner surface of the housing, which scraps and cleans this surface.

Scraped surface heat exchangers are typically used in the food industry, for example for the processing of sauces, tomato, etc. However, they are not suitable for the coagulation of conventional liquid egg, because the product does not coagulate homogeneously in this apparatus. Big lumps of coagulated egg are formed inside of the heat exchanger, which do not allow the flow of the incoming liquid egg. This results in a loss of inside pressure, and clogging and blocking the apparatus. In addition, non-modified coagulated egg sticks strongly to the inside and at the outlet of the heat exchanged, making it difficult for the material to progress to the next step. As mentioned above, this problem is also observed if liquid egg is only acidified to a pH value above those of the invention.

Surprisingly, the inventors have found that a modification of the liquid egg as explained above allows the use of a scraped surface heat exchanger for the coagulation step, avoiding the problems just mentioned. Additionally, this kind of exchanger can be used in a continuous operation. Therefore, in one aspect the invention is directed to the use of a scraped surface heat exchanger in a process for the coagulation of liquid eggs, wherein the pH of the liquid egg is in a range of from about 3 to about 6.0, preferably from about 3 to about 5.8, preferably from 4.0 to 5.8, more preferably from 4.5 to 5.5, more preferably form 4.5 to 5.3, even more preferably from 4.5 to 5.1, especially preferred from 4.9 to 5.1.

The modified liquid egg material is suitably pumped from the storage vessel to the scraped surface heat exchanger which is conveniently heated by hot water, generally at a maximum temperature of 90° C., preferably 85° C., and maintained under the chosen operating pressure. The operating pressure or temperature of the heat exchanger can generally be adjusted by the skilled person depending on the apparatus being used and the process conditions. In a preferred embodiment the coagulated egg exits the exchanger at a temperature of from about 70-85° C., preferably from about 75° C. to about 80° C. The processing time in the scraped surface heat exchanger ranges from about 10 minutes to about 15 minutes. The modified liquid egg coagulates and exits the heat exchanger in the form of slurry of small coagulated egg particles.

In a preferred embodiment of the invention, the scraped surface heat exchanger has been modified to make it more suitable for handling modified liquid egg. In particular the paddles or blades and the sealing means have been adapted to the product being processed.

The coagulated slurry product exits the heat exchanger and is conveyed into a dryer, in order to reduce its water content. Preferably, a rotary drum dryer is used, but any other dryer can be used as long as it is suitable for this product. In the drier the slurry of coagulated egg is heated with hot air to a temperature of from about 150° C. to about 250° C., for a time from about 30 minutes to about 60 minutes. This heat treatment reduces the water content from about 70% by weight to about 5% by weight. In addition, the drier produces a granulation of the product, forming particles of a size that depends on the parameters of the drier. If necessary, the particle size can be reduced and controlled by using grinding or other means such as a mill or a sieve. The particles size of the coagulated egg product of the invention can thus be adjusted to the desired value depending on the final use of the product. Sizes of from about 0.1 to about 3.0 mm diameter, preferably from about 0.1 to about 1.0 mm, have been made, which are suitable for example for using the product as an additive to animal food.

The final product which exits the drier, or optional grinder or mill, is packaged and ready for use. The product obtained is characterized by having a water content of less than 15%, preferably less than 10%, and is formed of small granules of coagulated egg. This product has protein content usually above 30% by weight, preferably above 40% by weight, and fat content of from 20% to about 40% by weight.

It is important that the final product is free from harmful bacteria such as *salmonella* or *clostridium*. If citric acid is used as acidifying means in the modification of the liquid egg, it will be also present in the final product, preferably in an amount of from 0.2% to about 0.8% by weight. In this case the final product already has a preserving agent.

The final composition of the coagulated egg product of the invention, and the controlled characteristics that result of the process of the invention, makes it very suitable for a variety of uses. It is a very good source of protein and fat that can be used in the animal food industry, directly or as an additive.

In another aspect, the invention is directed to a coagulated egg product obtainable by the process as defined above, and to the use of this product in animal food.

In a particular embodiment, the coagulated egg product is characterized by having a water content of less than 15% by weight, a protein content above 30% by weight and a fat content from about 20% to about 40% by weight. Preferably, the coagulated egg product is characterized by having a water content of less than 10% by weight, a protein content above 40% by weight and a fat content from about 20% to about 40% by weight.

In a preferred embodiment, said coagulated egg product is in the form of granules having a mean particle size of from about 0.1 to about 3.0 mm, more preferably from about 0.1 to about 1.0 mm.

In a preferred embodiment, said coagulated egg product has an acid content, preferably a citric acid content, of from about 0.2% to about 0.8% by weight An example of an installation suitable for the invention is depicted in FIG. 1. The installation comprises a shell centrifuge 1, a storage tank 2 cooled with ice-water and fitted with a stirrer. A metering pump 3 is situated between the storage tank 2 and a scraped surface heat exchanger 5 having a motor, heated by hot water and attached to a precision valve, a pressure-gauge. A rotary drum dryer 6 is connected to the outlet of the scraped surface heat exchanger. Finally there is a container and filling device.

The process and the product of the invention solve an important problem of the poultry industry, which is the disposal of (wasted) eggs. A liquid and viscous product, difficult to handle and prone to contamination, is transformed with a simple process and installation into a final product of economical value and of a much more convenient manipulation and storage.

The skilled person will appreciate that the process of the invention can be operated in a continuous or a batch mode.

The invention will be further illustrated by means of examples, which should not be interpreted as limiting the scope of the claims.

EXAMPLE

Example 1

A hatchery handling 800,000 fertilised chicken eggs a week generates an average of about 80,000 (10%) wasted eggs a week. These eggs were processed according to the invention.

The wasted eggs are detected a few days before hatching, by passing the eggs through a machine which selects, using a light detector, eggs with formed embryos and discard those that did not incubate.

The wasted eggs are conveyed to a shell centrifuge to separate the shell, and then to a storage tank maintained with stirring at 4° C. The storage tank contains an amount of about 2,000 Kg (L) of liquid egg, corresponding to about 40,000 wasted eggs.

Citric acid is added to the storage tank in an amount of 4.5 g per kg of wasted liquid egg, adjusting the pH to about 5.0.

The mixture of liquid egg and citric acid is kept for 2 days until it is pumped to a scraped surface heat exchanger of 18 meter length, in sections of 6 meters, each which is heated up to 85° C. with warm water. The retention time is 10-15 minutes.

The obtained slurry product is directly conveyed to a drum drier of 4.5 m length and internal diameter of 80 cm heated at 160° C. and with a residence time of 45 minutes.

The obtained product has a granular and homogenous aspect. It was analyzed to give the following results:

| COMPONENTS | RESULTS | PARAMETER VALUES |
|---|---|---|
| Mineral material (%) | 2.97 | ≤6% |
| Proteins (%) | 44.20 | ≥30% |
| Water content (%) | 21.40 | ≤10% |
| Fats (%) | 27.80 | ≥30% |

In addition, *Salmonella* spp. and *Clostridium perfringens* were not detected in a microbiological analysis.

Successive batches with the same process resulted in the same product, with little variation in the properties or aspect.

What is claimed is:

1. A process for the production of a coagulated egg product which comprises, in order, the following steps:
    a) separating the liquid egg from the shells;
    b) acidifying the liquid egg product to a pH in the range of from 4.5 to 5.3;
    c) heating and coagulating the acidified liquid egg in a scraped surface heat exchanger;
    d) drying the acidified and coagulated egg product resulting from step c) to obtain a granulated product having a water content of less than 10% by weight.

2. The process according to claim 1, wherein the acidifying step b) comprises the addition of an acid.

3. The process according to claim 2, wherein the acid is citric acid.

4. The process according to claim 1, wherein the process is in continuous mode.

5. The process according to claim 1, wherein the process is in batch mode.

6. The process according to claim 1, wherein the process comprises a step of grinding and optionally sieving the product, and storing it in a container.

7. The process according to claim 2, wherein the acid is a food preservative.

* * * * *